US011422525B2

(12) United States Patent
Jousset (10) Patent No.: US 11,422,525 B2
(45) Date of Patent: Aug. 23, 2022

(54) METHOD FOR CONTROLLING THE LEVEL OF SCREWING QUALITY OF A SCREWDRIVER, ASSOCIATED DEVICE AND PROGRAM IMPLEMENTING THE METHOD

(71) Applicant: ETABLISSEMENTS GEORGES RENAULT, Saint Herblain (FR)

(72) Inventor: Nicolas Jousset, Coueron (FR)

(73) Assignee: ETABLISSEMENTS GEORGES RENAULT, Saint Herblain (FR)

( * ) Notice: Subject to any disclaimer, the term of this patent is extended or adjusted under 35 U.S.C. 154(b) by 102 days.

(21) Appl. No.: 16/678,385

(22) Filed: Nov. 8, 2019

(65) Prior Publication Data
US 2020/0150615 A1 May 14, 2020

(30) Foreign Application Priority Data
Nov. 9, 2018 (FR) ........................................ 1860400

(51) Int. Cl.
B25B 21/00 (2006.01)
B25B 23/14 (2006.01)
G05B 19/18 (2006.01)

(52) U.S. Cl.
CPC ............ *G05B 19/186* (2013.01); *B25B 21/00* (2013.01); *G05B 2219/49001* (2013.01)

(58) Field of Classification Search
CPC ..................................................... B25B 23/14
(Continued)

(56) References Cited

U.S. PATENT DOCUMENTS 4,000,782 A 1/1977 Finkelston
4,259,775 A * 4/1981 Eshghy ................. B23P 19/066
173/183
(Continued)

FOREIGN PATENT DOCUMENTS

DE 102013016068 A1 4/2015
FR 2882287 A1 8/2006
(Continued)

OTHER PUBLICATIONS

English translation of the French Written Opinion dated Aug. 1, 2019 for corresponding French Application No. 1860400, filed Nov. 9, 2018.
(Continued)

*Primary Examiner* — Thanh K Truong
*Assistant Examiner* — Patrick B Fry
(74) *Attorney, Agent, or Firm* — David D. Brush; Westman, Champlin & Koehler, P.A.

(57) ABSTRACT

A method for controlling a level of screwing quality of a screwdriver relative to a predetermined screwing objective. The method includes: obtaining, at a predetermined angular frequency, a series of doublets representative of a rise in screwing torque for at least one screw, constituting a first table of values, each doublet including an angle value and a torque value; determining, from the first table, a second table of values presenting the torque as a function of the angle and being representative of the true characteristic of the at least one screw; determining a third table of values, presenting the torque as a function of the angle and being representative of disturbances induced by the screwdriver during the rise in torque, from the first and second tables; analysis of the third table, delivering information representative of a dispersion and/or a deviation relative to the screwing objective, resulting from the screwdriver-induced disturbances.

13 Claims, 7 Drawing Sheets

(58) Field of Classification Search
USPC .......................................................... 702/41
See application file for complete search history.

(56) References Cited

U.S. PATENT DOCUMENTS

| | | | |
|---|---|---|---|
| 5,284,217 A * | 2/1994 | Eshghy | B25B 23/14 173/176 |
| 7,398,700 B2 * | 7/2008 | Makimae | B23P 19/066 173/176 |
| 7,735,374 B2 | 6/2010 | Marie et al. | |
| 9,874,493 B2 * | 1/2018 | Brandstrom | F16H 57/01 |
| 2015/0021062 A1 * | 1/2015 | Sekino | B25B 23/1453 173/183 |
| 2015/0177098 A1 * | 6/2015 | Brandstrom | G01M 13/021 702/41 |

FOREIGN PATENT DOCUMENTS

| | | | |
|---|---|---|---|
| FR | 2896440 A1 | 7/2007 | |
| WO | 2017207550 A1 | 12/2017 | |

OTHER PUBLICATIONS

French Search Report and Written Opinion dated Aug. 1, 2019 for corresponding French Application No. 1860400, filed Nov. 9, 2018.

* cited by examiner

METHOD FOR CONTROLLING THE LEVEL OF SCREWING QUALITY OF A SCREWDRIVER, ASSOCIATED DEVICE AND PROGRAM IMPLEMENTING THE METHOD

1 FIELD OF THE INVENTION

The field of the invention is that of industrial tools and more particularly tools designed for screwing at a determined torque.

The invention relates more specifically to checks or controls on the quality of the work carried out by such tools, for example to identify a defect or a condition of wear and tear of the tool and, if necessary, to trigger the issuing of an alert.

2 TECHNOLOGICAL BACKGROUND

In the field of industrial production, for example the production of motor vehicles and aircraft, screwing tools are very widely used. These tools, which can be fixed or portable (and in the latter case equipped with batteries), incorporate motors, which may be electrical or pneumatic depending on the applications in view. These tools can be connected (by radio or by wire) to a controller (which for example takes the form of a pack or box) used to manage or drive different working cycles.

In general, the screwing operation is enslaved (i.e. servo-controlled) and the tool measures the torque applied to the screw by the screwdriver. This measurement is transmitted to the controller which verifies that its value is situated within the boundaries laid down in the screwing strategy. In this way, the controller can trigger the stoppage of the work when the measurement of the torque reaches a threshold value. The screwing results can be recorded in quality databases for a posteriori treatment and/or used by the operator to check whether the tightening is accurate or not.

The controller is used especially to ensure traceability of the operations performed by the tool, in ensuring for example the recording of results such as the final screwing torque, screwing speed, the final screwing angle, the date and time of the operations or again tables representative of the quality of the screwing performed (whether good or poor as a function of predetermined parameters).

The measurement made by the sensor equipping the tool reflects the torque applied to the screw. This measurement is impacted by different transmission elements which add noise to the measured signal. The screwdriver comprises at least the following elements:
  a motor,
  one or more epicyclic gear trains aimed at increasing the torque produced by the motor,
  a torque sensor.

It can also include other elements, especially angular gear transmission elements.

All these elements can disturb the signal of the sensor which is then no longer a perfect image of the torque applied to the screw. This noise can for example prompt a stoppage that does not correspond to the predefined setpoint value for stoppage, and therefore leads to poor screwing operations whereas the screwdriver sends back positive reports. In addition, the deterioration of the transmission elements can lead to an increase in noise in the measured signal. This increase in noise leads to a diminishing in the performance of the tool (deterioration of precision).

It is therefore necessary to control or check the precision of these screwing means and ascertain that the tools are working properly whether it is for controlling and/or tracking screwing parameters or for the efficient execution of these parameters.

In other words, the reliability of the tools should be verifiable and this should be done regularly throughout the duration of use of the tools, so as to make it possible to carry out maintenance, preferably preventive maintenance. It is thus sought especially to prevent states of wear and tear leading to poor screwing quality and/or to breakage of the tools on the production line, then requiring that the production line be halted in order to replace the tool. This naturally harms the overall efficiency of the production line concerned.

There are known ways of applying preventive maintenance by keeping an account of the number of times the tool is used (the number of screwing operations or totalized time of use) and then comparing the value of the counter with recommendations produced by the tool manufacturers, these recommendations being expressed in the form of a periodicity of maintenance. This method comprises an empirical approach that gives a statistical estimation of the wear and tear of a tool but does not truly give its current state.

There are also known ways of carrying out regular controls on test beds. These controls require a stoppage of production, the tool being moved to the test bed, generally in a site distinct from the production site. This leads to a production slowdown and/or to the use of replacement tools.

The ISO5393 standard thus stipulates the performance of at least 25 test screwing operations to control a screwing tool.

The controls can be done in different ways. For example, the document FR2882287 describes a screwing tool comprising a rotating element mounted on a body and a tightening torque measurement sensor. The measurement of the torque gives information that can be used to determine the state of wear and tear of the elements. More specifically, this document provides teaching on the processing of a frequency spectrum in order to extract at least one vibration frequency associated with a rotating element. This frequency is then compared with a reference frequency in order to determine the state of wear and tear of the rotating element considered.

This makes it possible to identify the flaws in the screwdriver but not a level of tightening precision.

There is therefore a need to implement a technique for controlling the operation of a screwing tool in order to determine whether the work carried out is within in a determined range or parameters or in other words to determine the quality of the work without introducing any interruption in production.

There is also a need to provide an alert making it possible to warn the user in real time about the incapacity of the tool to accurately carry out a screwing operation, for example when using a screwdriver on an assembly line.

Finally, there is a need to provide a rapid estimation of the dispersion and deviation from a tightening objective or target. This means doing so in a speedier and simpler manner than with currently performed tests (for example according to the ISO5393 standard).

3 SUMMARY OF THE INVENTION

The invention thus proposes a method for controlling or checking a level of screwing quality of a screwdriver relative to a predetermined screwing objective or target, implemented during the screwing of at least one assembly and comprising the following steps:

obtaining, at a predetermined angular frequency, of a series of doublets representative of the rise in torque in the screwing of at least one screw, constituting a first table of values, each doublet comprising an angle value and a torque value;

determining, from said first table of values, a second table of values presenting the torque as a function of the angle and representative of the true characteristic of the at least one screw;

determining a third table of values presenting the torque as a function of the angle and representative of disturbances induced by said screwdriver during the rise in torque in the screwing of at least one screw, from the first and second tables;

analysis of the third table, delivering at least one piece of information representative of a dispersion and/or a deviation relative to said screwing objective, resulting from disturbances induced by said screwdriver.

Thus, the invention makes it possible to determine parameters representative of a disturbance (related for example to the engagement of gear teeth, the electrical disturbances in signals, etc.). Such a disturbance is characterized especially by an oscillation of the signal around its real value, at variable frequencies and amplitudes. With the disturbance being known, it is thus possible to determine dispersion values of the tool as well as a calibration defect resulting from this disturbance.

It is also possible to compute what the dispersion and/or the deviation would be relative to the objective for a screw having a stiffness value other than the one on which the screwing operation is performed. These values would make it possible to speedily determine whether or not the tool is still capable of carrying out the work in the required conditions, and if necessary, still capable of triggering a warning signal to repair it or replace it.

The approach of the invention is not only speedier but above all it enables real-time, direct processing on the production line, unlike in the prior-art solutions.

The term "table", in the present description and in the claims, refers to sets or series of doublets of values of the type (x, y). These sets can if necessary be represented and/or registered in different forms (data tables, equations, etc.).

According to one particular aspect, the method can include a step for generating a warning signal, if said at least one piece of information representative of a dispersion and/or a deviation is above a predetermined threshold.

In this way, the operator is warned immediately, especially if the screwdriver is not capable of performing the work with the expected level of precision.

In one particular implementation, the step for obtaining a series of doublets at a predetermined angular frequency implements:

a measurement and a recording of said doublets at a predetermined time frequency;

a classification of said doublets in a rough table following a rising or descending order of values of angles;

a computation of said table, by
choosing the angle values in the form of an arithmetical sequence having a constant angular pitch (or step); and
by computing the torque value for each value of said sequence in using an interpolation of the values of the rough table.

In expressing the torque as a function of the angle and not as a function of time, we overcome the rotation speed of the screwdriver which can vary during the screwing operation and make the assessment of the parameters more complex.

Said step for determining said second table can especially implement at least one of the following operations:
linear regression applied to said first table;
polynomial regression applied to said first table;
lowpass filtering applied to said first table at a cut-off frequency at the value of the defect having the lowest frequency.

These different examples of digital processing methods (filtering) make it possible to efficiently determine an image of the true characteristic of the screw, in computing a theoretical characteristic of this screw.

According to one particular aspect, the computation of the third table can include the following steps:
subtraction, from the torque values of said first table, of the corresponding torque values of the second table;
division of the obtained torque values by corresponding torque values of the second table.

There are thus normalized oscillations available.

In a first embodiment, offering high precision, said step of analysis of the third table comprises the following sub-steps:
applying a discrete Fourier transform to the third table, delivering a frequency and an amplitude for each disturbance of a series of disturbances;
selecting at least one vibratory signature, represented by a frequency and an amplitude and representative of a disturbance present in said third table;
selecting a desired linear characteristic;
taking the sum of said linear characteristic and a sinusoidal signal having as a frequency, the frequency of said signature and having as an amplitude, the amplitude of said signature multiplied by the torque of said screwing objective, delivering a first relationship expressing a torque as a function of an angle;
maximizing said first relationship so as to eliminate the decreases in torque value, giving a second relationship expressing a torque as a function of an angle;
subtracting, from said second relationship, said linear characteristic to obtain a third relationship expressing a torque as a function of an angle;
computing the dispersion and/or the deviation from said screwing objective, induced by each vibratory signature from said third relationship;
then, for all the vibratory signals selected:
computing the overall dispersion and/or overall deviation from said screwing objective induced by said selected vibratory signatures.

In this way, the vibratory signatures (in frequency and in amplitude) of the disturbances that can be read on the signal of the torque measured by the sensor are revealed by computing the difference between the theoretical behavior of the assembly during a task and the progress of the torque as a function of the angle measured during this work.

The desired linear characteristic can especially be, according to need, the characteristic of the second table or another characteristic (elastic, sharp).

According to one particular characteristic of this first embodiment, the sub-step of computation of the dispersion and/the deviation relative to said screwing objective induced by each vibratory signature comprises at least one of the following operations:
determining a mean value of said third relationship over a predetermined screwing angle interval;
determining a standard deviation, from the third relationship, on a predetermined screwing angle interval, representative of the dispersion introduced by the disturbance considered.

We thus have effective information on the dispersion generated by each disturbance.

In this first embodiment, the step for computing the total dispersion and/or the total deviation can especially include the following sub-steps:

summing of mean values corresponding to each of the disturbances, delivering a piece of data representative of the deviation relative to the screwing objective induced by all the disturbances;

aggregation of standard deviations corresponding to each of the disturbances, delivering a piece of data representative of the dispersion induced by all the disturbances.

We thus have a piece of effective information on the dispersion generated by the set of disturbances.

In this first embodiment, the step for obtaining can be implemented over an angular range of screwing of at least 720.

This can be done in a single screwing operation or, in one embodiment, by implementing an aggregation of at least two first tables, corresponding to at least two screwing operations, so as to have an angular screwing range of at least 720°.

In a second embodiment, which is more simple but less precise than the previous one, the step for determining the third table comprises the following sub-steps:

maximizing data of said first table so as to eliminate the decreases in torque to give a maximized table;

subtracting, from the torque values of said maximized table, of the corresponding torque values of said second table, to give a differential table;

dividing the torque values of said differential table by the corresponding torque values of the second table to give said third table.

This second embodiment removes the need to carry out an FFT, while at the same time giving results which, although less precise than in the first embodiment, are sufficient for numerous applications. Those skilled in the art could therefore turn to either of the embodiments depending on the desired precision of the results and the desired processing complexity. Those skilled in the art could, in the light of these two examples of implementation, also conceive of other variants.

In this second embodiment, the step of analysis can for example include at least one of the following sub-steps:

determining a mean for said third table;

determining a standard deviation of said third table representative of the dispersion induced by said screwdriver on the measured torque.

We thus have effective information available on the dispersion generated.

In the different embodiments, the method can include a step for generating results of evaluation of a level of dispersion and/or a deviation relative to a screwing objective, for a given disturbance and/or for a set of disturbances.

The results delivered can naturally be adapted, in their content and presentation, especially according to needs and applications.

According to another aspect, the invention relates to a screwdriver implementing the method as described here above, comprising at least one rotating element liable to generate disturbances on the torque applied to a screw. Said screwdriver comprises means for controlling a level of screwing quality relative to a predetermined screwing objective, implemented during the screwing of at least one screwdriver and comprising:

means for obtaining, at a predetermined angular frequency, a series of doublets representative of the rise in torque in the screwing of at least one screw constituting a first table of values, each doublet comprising an angle value and a torque value;

means of determining, from said first table of values, of a second table of values presenting the torque as a function of the angle and representative of the true characteristic of the at least one screw;

means for determining a third table of values presenting the torque as a function of the angle and representative of the disturbances induced by said screwdriver during the increase in torque in the screwing operation for at least one screw, on the basis of the first and second tables;

means for analyzing the third table, delivering at least one piece of information representative of a dispersion and/or a deviation relative to said screwing objective, resulting from disturbances induced by said screwdriver;

means for generating a warning signal, if said at least one piece of information representative of a dispersion and/or a deviation is above a predetermined threshold.

According to yet another aspect, the invention also relates to a computer program product comprising program code instructions to implement the method of control according to any one of the above paragraphs, when said program is executed by a microprocessor.

4 LIST OF FIGURES

Other features and advantages of the invention shall appear from the following description, given by way of an indicatory and non-exhaustive example and from the appended drawings of which:

FIG. 5.1 presents an example of a linear characteristic corresponding to a given stiffness according to a first embodiment;

FIG. 5.2 presents an example of a curve representative of the first relationship according to the first embodiment;

FIG. 5.3 presents an example of a curve representative of the second relationship according to the first embodiment;

FIG. 5.4 presents an example of a curve representative of the third relationship, according to the first embodiment;

FIG. 6.1 presents an example of a curve representative of the first table, according to a second embodiment;

FIG. 6.2 presents an example of a curve representative of the second table, according to the second embodiment;

FIG. 6.3 presents an example of a curve representing an intermediate table illustrating a fact that the tool always stops at the level of a maximum value, according to the second embodiment of the invention;

FIG. 6.4 presents an example of a curve representing the third table, according to the second embodiment.

5 DETAILED DESCRIPTION OF THE INVENTION

In all the figures of the present document, the identical elements and steps are designated by a same reference.

The general principle of the technique described relies on the computation of what would be the dispersion of a screwing tool or screwdriver and its mean deviation relative to the tightening objective on the basis of disturbances detected in the signal produced by its torque sensor.

Figure 1:
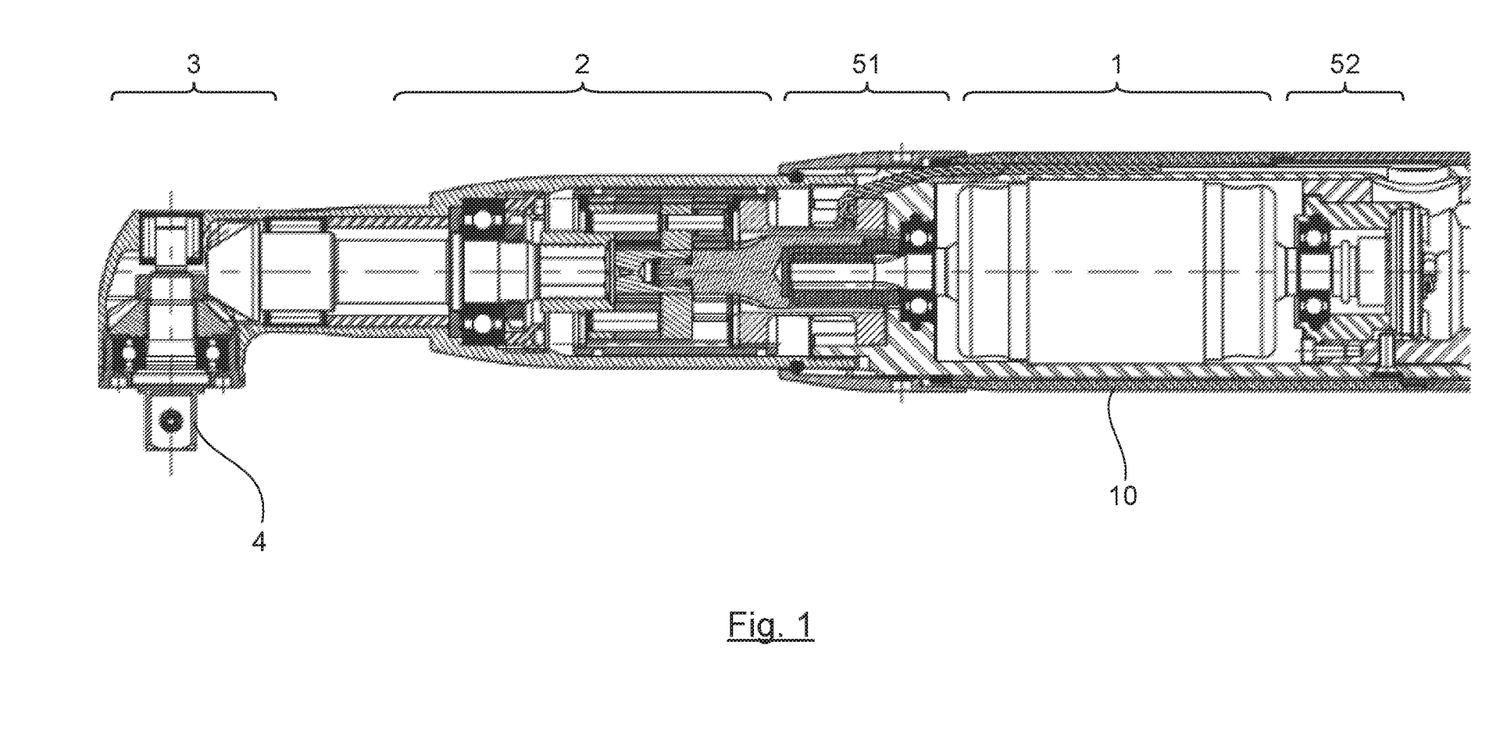
FIG. 1 is a view in section of a tool integrated into a tooling set according to the invention.

Referring to FIG. 1, a screwing tool according to the present embodiment comprises a motor 1 mounted in the body 10 of the tool, the motor output being coupled to a gearing or a reduction gear 2 formed by epicyclic gear trains, itself coupled to an angle transmission gearing 3 (since the screwing axis here is perpendicular to the drive axis; the angle transmission 3 can be absent in the case of another embodiment that can be envisaged according to which the screwing axis and the motor axis are coaxial) intended to rotationally drive a screw head having a bit 4 designed to receive a screw bushing.

In a manner known per se, a torque sensor 51 (for example a bridge of stress gauges) delivers a piece of information on the tightening torque exerted by the tool. An angle sensor 52 is also planned in the rear of the motor. It can for example comprise a rotating magnet before a Hall effect sensor carried by an electronic board.

Figure 2:
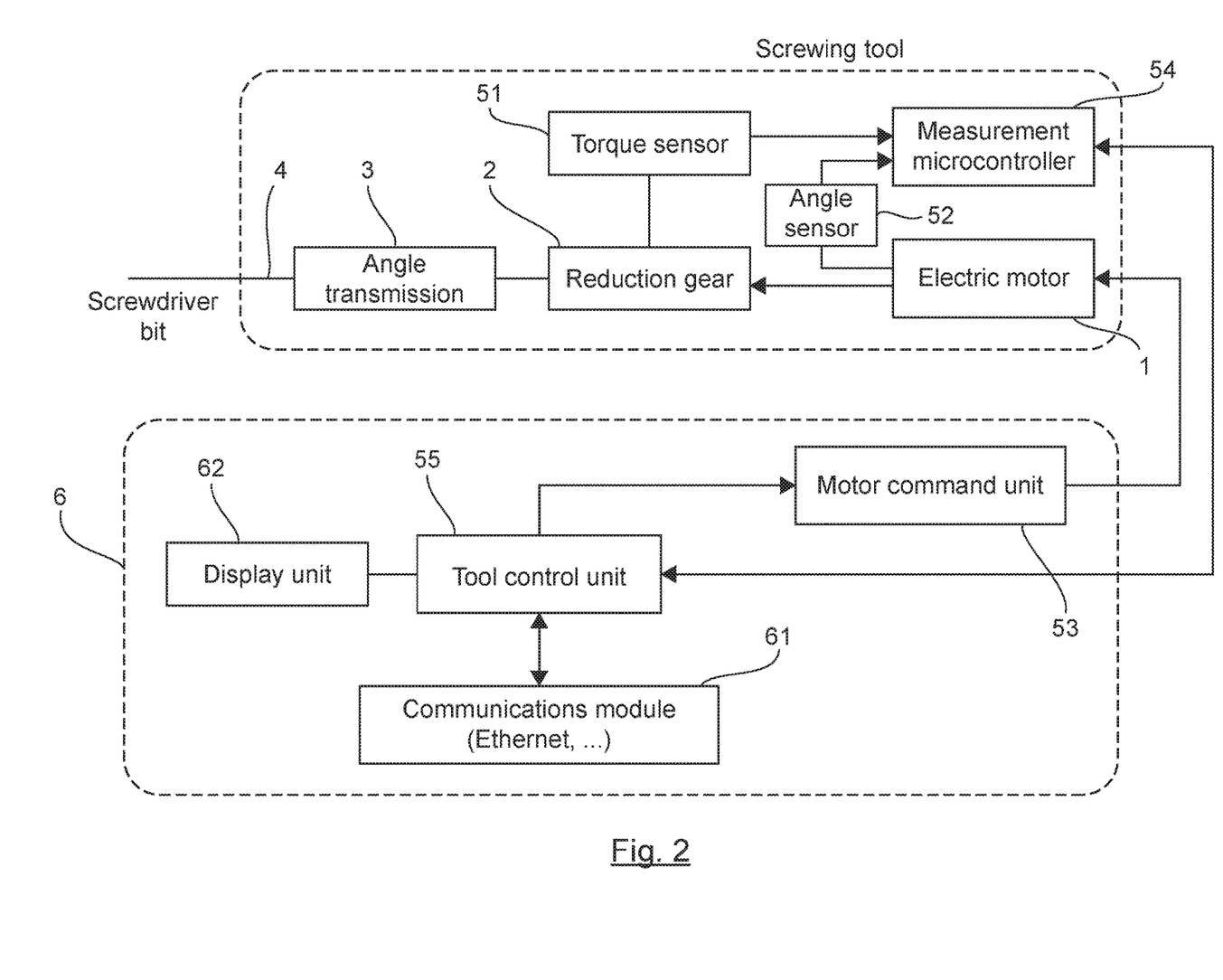
FIG. 2 is a functional diagram of a tooling set according to the invention.

In the functional diagram of FIG. 2, the mechanical elements are this time represented schematically so as to show the motor 1, the reduction gear 2 and the angle transmission element 3.

As illustrated, the torque sensor 51 is connected to a measuring microcontroller 54 which transmits the data to a control unit 55 of the tool.

Depending on the data given by the torque sensor 51, a control unit 55 drives the operation of the motor 1 by means of a command unit 53.

The control unit 55 furthermore integrates signal processing means provided by the torque sensor 51 to deliver at least one piece of information representative of a dispersion and/or deviation relative to said screwing objective resulting from disturbances generated by the screwdriver.

According to the present embodiment, the control unit 55 and the command unit 53 are integrated into a unit 6 designated by the term "screwing controller" in FIG. 2.

The screwing controller 6 can furthermore integrate:
- a communications module 61 used to connect the controller 6 to an information exchange network, for example of the Ethernet type;
- a display unit 62.

Thus, when the controller 6 detects that the values of dispersion or deviation relative to a setpoint value no longer meet production requirements, a signal and/or a warning message is displayed on the display unit 62 and, as the case may be, sent to a remote station by means of the communications module.

In the case of a battery tool, the tool control function 55 and the motor command function 53 can be integrated into the tool.

According to one embodiment, such a message can inform the faulty element concerned, for example by comparing the individual dispersion relative to threshold values or a percentage of dispersion, and can also specify the type of maintenance and/or servicing to be performed.

It may be recalled that the tightening torque is determined from a voltage transmitted by the torque sensor 5.

After having given details, through examples, of the main devices for implementing the invention, we shall now explain the way in which these devices cooperate in the context of a method for controlling a level of screwing quality for a tool.

Figure 3:
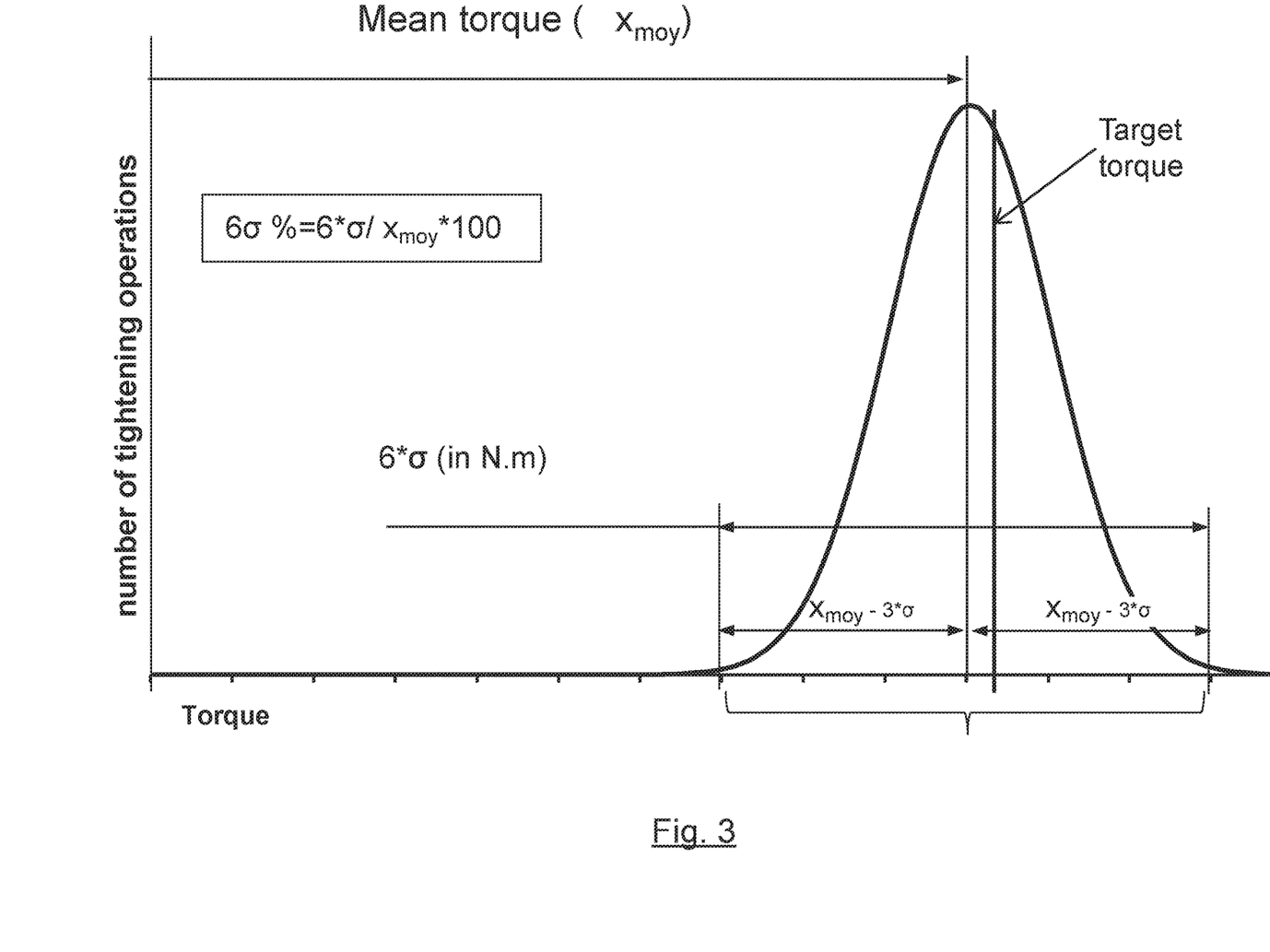
FIG. 3 shows a schematic example of the variations in tightening torque as a function of the number of tightening operations performed by one and the same tool.

The curve of FIG. 3 illustrates the variations in tightening torque as a function of number of tightening operations measured. This curve is elaborated on the basis of several measurements (for example 25 to 100) to carry out statistical studies on the behavior of a tool. Exploiting the results especially gives the following two pieces of data:
- the dispersion of the tightening operations for the tool, characterized by a standard deviation (a), providing information on the capacity of the tool to reproduce a torque with precision. The dispersion is generally expressed as six times the standard deviation divided by the mean in percentage;
- the deviation from the objective (or target value), assessed by computing the difference between the mean and the objective, divided by the objective. The preliminary calibration of the screwdriver relative to the objective is aimed at having the lowest possible deviation.

The measurement curve typically has a Gaussian shape, almost all the tightening operations (99.73% in the tests performed) being situated in the $6\rho$ zone.

To accurately estimate the precision of the tool during a single tightening operation (or on a limited number of tightening operations), it is necessary for all the defects to be present on the torque curve. Now, a defect that occurs once every turn of output shaft of the screwdriver will not necessarily appear if the screw requires a 30° rotation to be tightened. A minimum rotation angle of 720° (at least two turns to analyze the low frequencies) of the output shaft is desirable (it is obtained on one or more screwing operations).

The disturbances prompted by the variations in torque from one screwing operation to another have various causes such as the engagement of the gear teeth or again electrical disturbances in the signals caused by the magnetic field of the motor which generate differences between the torque measurement and the torque actually applied to the screw.

These disturbances are characterized by an oscillation of the measurement of the torque of the tool around what would be the value really applied to the screw if it had been measured in real time by a sensor placed between the screw and the screwdriver.

This oscillation occurs at variable frequencies and amplitudes depending on the origin of the disturbances.

In the context of the present description, it is taken as a hypothesis that the amplitude of the disturbances is proportional to the instantaneous torque given by the screwdriver. The consequence of this is that the dispersions and deviation are of the same level whatever the tightening torque.

According to the results of estimation, the method according to the invention comprises a step for sending out a warning signal when the controller 6 detects that the dispersion or deviation from the setpoint value of the tightening operations no longer meets production requirements. This warning responds to quality constraints but also to security constraints. A warning can also be generated upon the detection of an abnormal amplitude of disturbance of a component with a view for example to carrying out a diagnostic operation. This can be especially rendered in the form of a table presenting the dispersions and the deviations for each disturbance as explained in greater detail here below with reference to the step 4.7 of the method of FIG. 4.

It is also possible, during a maintenance test, to estimate the dispersion and the deviation relative to the setpoint value of the screwdriver tightening operations for the usual test stiffness values, thus enabling speedy controls on the tool.

It can be noted that this estimation does not take account of certain effects of the screwdriver such as insufficient braking of the motor when the tightening objective is attained. It is indeed difficult and unnecessary to determine what happens after the motor is stopped.

One of the aspects of the invention consists in computing what would be the dispersion of a screwing tool and its mean deviation relative to the tightening objective on the basis of disturbances detected in the signal produced by its torque sensor 51. This evaluation can be done during a single tightening operation performed on a production line for example. This evaluation is therefore far speedier than that in which a diagnosis is conducted, generally necessitating several tens of tightening operations on a test bed.

5.1 First Embodiment of the Invention

Figure 4:
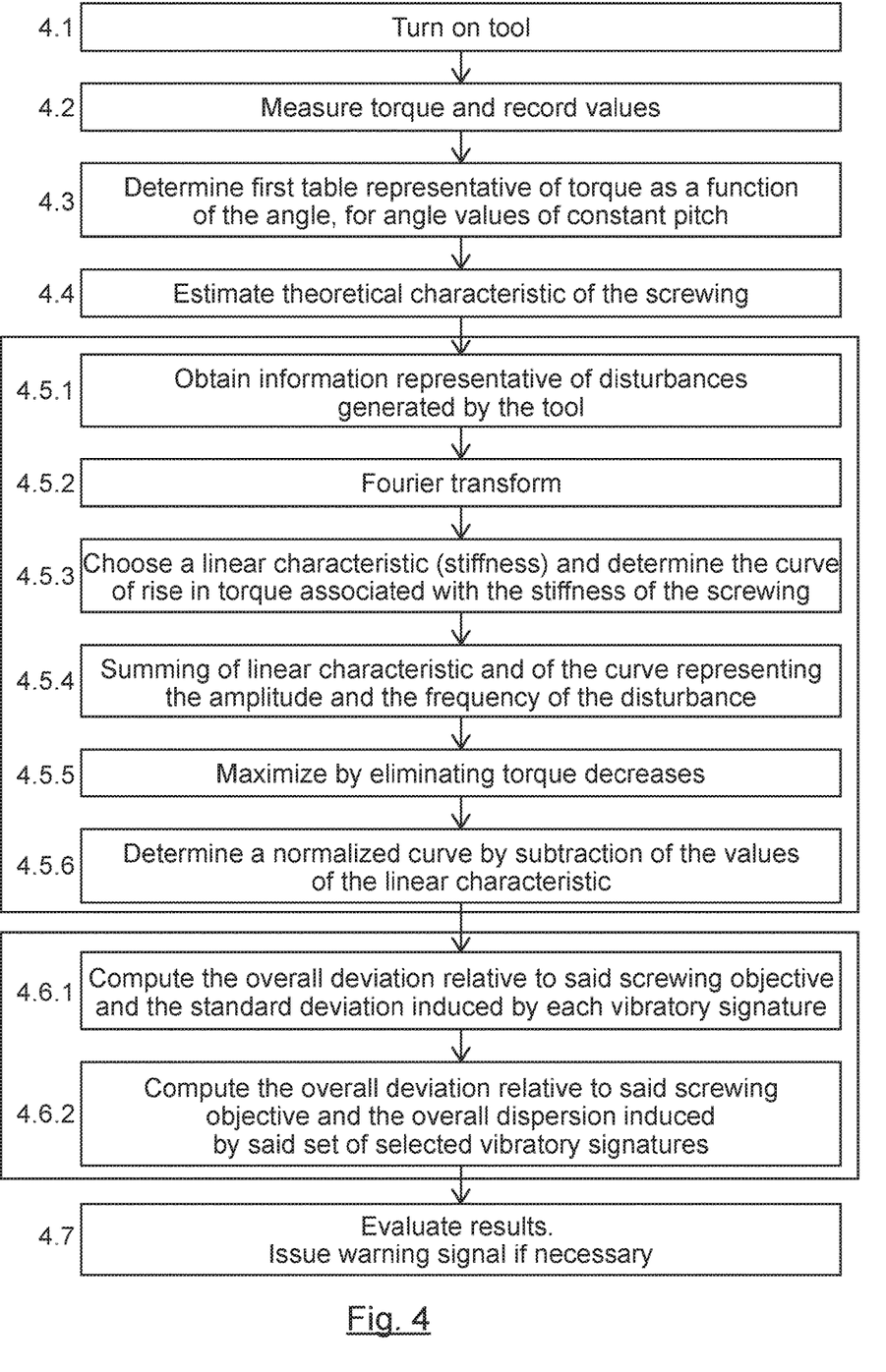
FIG. 4 presents a flowchart of the main steps for implementing a method for controlling or checking a level of quality according to a first embodiment.

Referring to FIG. 4 a first embodiment is now presented. FIG. 4 is a flowchart of the main steps for the implementing of a method for controlling a quality level of screwing by a screwdriver, relative to a predetermined screwing objective, according to one first example of an embodiment.

At the step 4.1 the tool, which is a screwdriver for example, is put into operation and carries out a task according to a screwing strategy for example. During the job, the sensors measure the value of the torque (sensor 51) and the angle (sensor 52) in referencing these measurements in relation to time. The measurements are taken every millisecond for example (step 4.2). The values of the sensors 51 and 52 are transmitted to the controller 6.

The controller 6 records the values of measurements in its memory and processes them in order to produce a table of doublets of torque values and angle values as a function of time, for example at predetermined time intervals. This table is called a "rough table".

At the step 4.3, the controller determines a table representative of the torque as a function of the screwing angle for angle values of constant pitch (i.e. obtained at a constant sample rate), to prepare a first table of doublets representative of the rise in torque for the screwing of at least one screw, each doublet comprising an angle value and a torque value. This step consists in:

- determining (I) an angular pitch which can be chosen arbitrarily and for example can correspond to a mean pitch situated between two values. In this case, it corresponds to the difference between the final angle and the initial angle, divided by the number of points between the two:

$$\Delta\theta = \frac{\theta_n - \theta_0}{n}$$

Thus, each new angle is computed as follows:

$$\theta'_i = i \times \Delta\theta;$$

Compute (II) the torque samples for each new angle defined. To carry out the second computation (II), according to a first approach, this computation implements a linear interpolation between two torque values of the first series:

$$C'_i = C_i + \frac{(C_{i+1} - C_i) \times (\theta'_i - \theta_i)}{\theta_{i+1} - \theta_i}$$

Other approaches, especially by polynomial interpolation of the first series of measurements, can also be used.

At the end of the step 4.3, the controller 6 sets up a series of values S1 represented by the value of the torque as a function of the angular pitch (each torque value being computed for constant angular pitch values).

We thus obtain the first table, representative of the relationship:

$$C_{sensor} = f(\alpha)$$

obtained from the doublets representative of the rise in screwing torque for screwing at least one screw, recorded in the first table. This first table removes the need for the rotation speed of the tool which can vary during the screwing operation.

At the step 4.4, the theoretical characteristic of the assembly is estimated. This step determines an image of the true characteristic of the screw in computing a theoretical characteristic.

Several methods of digital processing (filtering) are possible, such as:

- linear regression applied to the table of torque values as a function of the angle.
- polynomial regression applied to the torque table as a function of the angle.
- lowpass filter having, as its cut-off frequency, the value of the defect having the lowest frequency. This method makes it possible for the useful part of the disturbances to be preserved in eliminating especially possible defects of the screw, which can be not linear.

At the end of this step, the controller 6 updates a second table containing a series of values S2 representative of the true characteristic of the screw as a function of the angular pitch (at constant angle pitch), and this series of values can be expressed by the formula:

$$C_{true\ characteristic} = g(\alpha)$$

At the step 4.5, the share of the signal resulting from the disturbances generated by the tool can at this time be isolated and quantified. According to one embodiment, this step can be sub-divided into several sub-steps:

1°] The step 4.5.1 consists in choosing, from the first table, only the information representative of disturbances generated by the tool.

For the same angle, the torque values of said second table are subtracted from the corresponding torque values of the first table. The result of these subtractions is divided by the corresponding torque values of the second table, expressed in percent.

$$\Delta C\% = (f(\alpha) - g(\alpha))/g(\alpha)$$

Thus, the values of the third table are determined.

In a second stage, at the step 4.5.2, the discrete Fourier transform is computed on this table in order to carry out a frequency analysis of the signal and reveal the different disturbances that appear in the form of a peak characterized by a certain frequency. The table here below presents, in the form of an example, values representative of frequency and amplitude of each disturbance detected.

| Disturbance | Frequency | Amplitude |
| --- | --- | --- |
| 1 | f1 | A1 |
| 2 | f2 | A2 |
| - - - | - - - | - - - |
| n | fn | An | n varying for example from 1 to 1000.

It can be noted that according to this mode of computation, the errors are considered to be independent of the torque, or to have little influence on its value.

2°] At the sub-step 4.5.3, a linear characteristic corresponding to a determined stiffness is chosen. This stiffness is an input parameter defined normatively, for example: sharp angle (30°)—elastic angle (360°), or between the two (in particular, this characteristic can be a true characteristic of the real assembly, defined by the second table). The tightening angle to be simulated $\alpha_{screw}$ is selected.

The dispersion is evaluated for each frequency fi present in the table here above. The table on rising torque as a function of the angle associated with this stiffness is expressed as follows:

$$T_R(\alpha) = \frac{\alpha}{\alpha_{screw}} \cdot C_{setpoint\ value}$$

where:

$T_R$ is the torque of the linear characteristic, $\alpha_{screw}$ is the total angle of the screwing (from 0% to 100% of the torque, in degrees), $C_{setpoint\ value}$ is the setpoint torque (in Nm).

Figure 51:
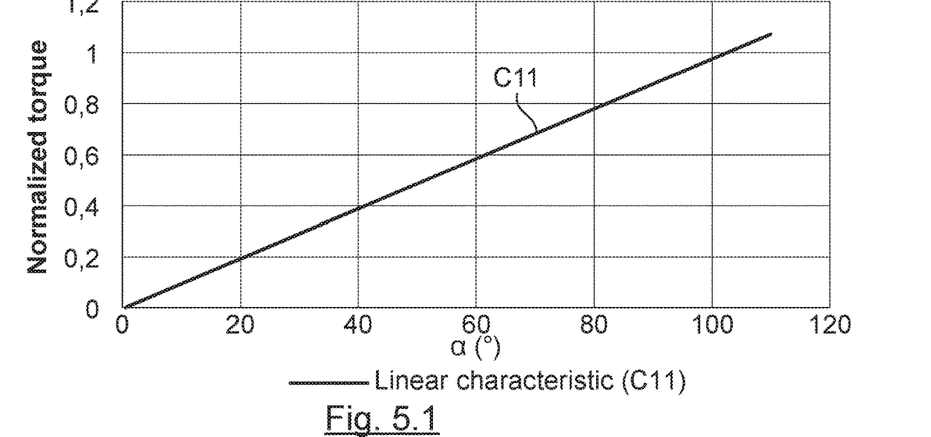

In this embodiment, the real torque is considered to be perfect, i.e. the torque increases proportionally with the angle (FIG. 5.1). The curve C11 illustrating this linear characteristic is a straight line segment, the slope of which is a function of the tightening angle.

3°] During the sub-step 4.5.4, the controller 6 determines a first mathematical relationship $T_c$ obtained by the sum of the curve C11 (the linear characteristic) and the sinusoidal curve, the amplitude and the frequency of which are those of the disturbance considered. The computation of this relationship of addition of the sinusoidal curve is implemented for each disturbance.

This expresses a first relationship:

$$T_c(\alpha) = T_R(\alpha) + C_{setpoint\ value} \cdot A \cdot \sin(2 \pi f \alpha)$$

where:

$T_c$ is the torque measured by the sensor 5 (in Nm),

A is the relative amplitude of the defect relative to the setpoint torque $C_{setpoint\ value}$, derived from the FFT (%), f is the frequency of the disturbance (deg-1).

Figure 52:
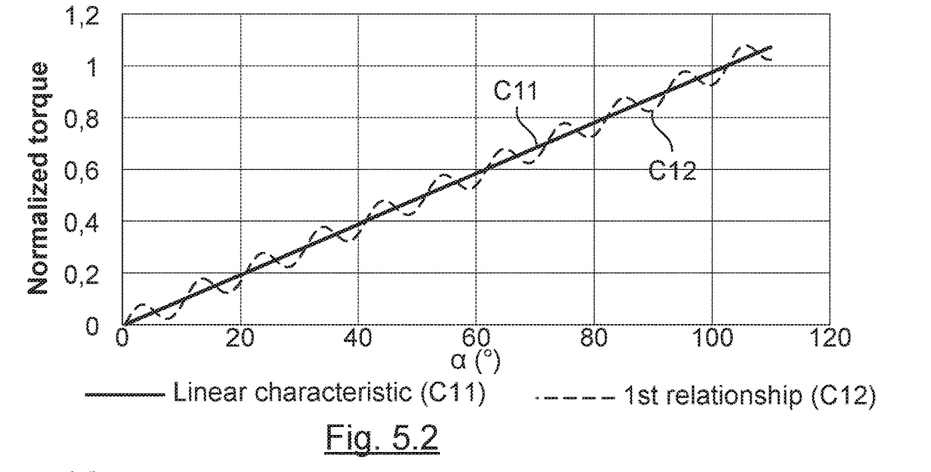

An example of a curve C12 produced by this first thematic relationship is presented in FIG. 5.2.

4°] At the sub-step 4.5.5, the controller 6 determines a second mathematical relationship, which expresses the fact that the stopping of the tool does not take account of the decreases in torque. This second relationship $T_s$ is derived from the first relationship and is expressed as follows:

$$T_S(\alpha) = \max_{0 \leq x \leq \alpha} T_c(x)$$

The torque values are maximized so as to eliminate the decreases, thus producing a second relationship expressing a torque as a function of an angle. In other words, $T_S$ is a fictitious representation of a torque that is constantly increasing, i.e. for which the stoppage of the tool cannot be activated on a torque value below a value previously attained during the work. According to this fictitious representation, the stoppage of the tool does not take place during a reduction of the torque, but when a "maximum" value is attained.

Figure 53:
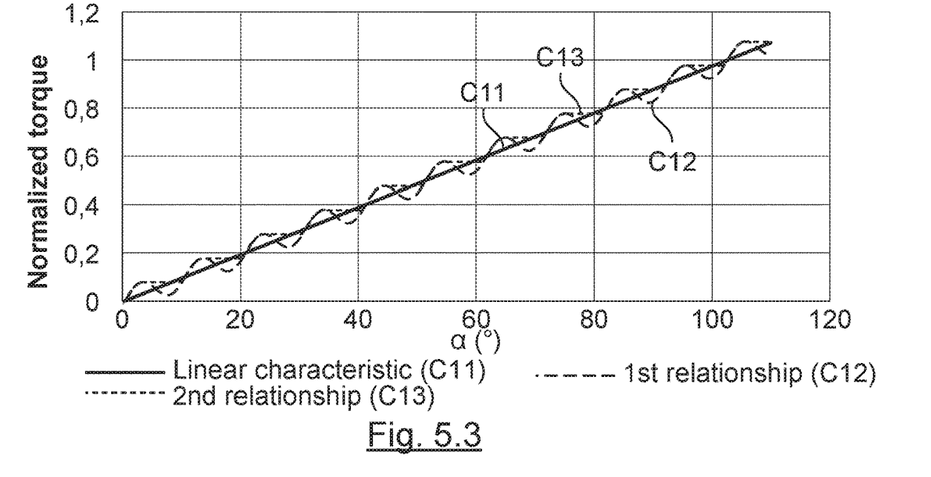

An example of a curve C13 illustrating this second mathematical relationship is presented in FIG. 5.3.

5°] During the sub-step 4.5.6, the controller 6 deduces, from this second relationship, a third relationship which corresponds to a subtraction, from the values obtained by means of the second relationship, of the corresponding values of the linear characteristic. This third relationship is mathematically expressed as follows:

$$T_S(\alpha) - T_R(\alpha)$$

Figure 54:
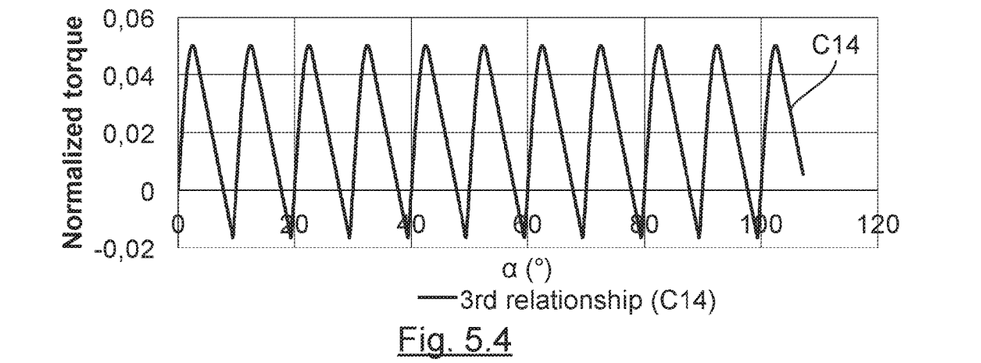

The table this obtained is illustrated by the curve C14 of FIG. 5.4.

Thus, at the end of the five steps 4.5.1 to 4.5.6, which are described here below according to one exemplary embodiment, the controller 6 can determine the dispersions and/or the deviation relative to the objective resulting from each disturbance generated by the tool (step 4.6).

At a first stage, at the step 4.6.1, the controller 6 evaluates the individual influence of the disturbances on the dispersion and/or the deviation of screwing relative to the objective.

According to one particular case, when the linear characteristic is selected at the step 4.5.3, the computation of the dispersion and of the deviation relative to the objective is done by considering a stiffness of assembly that can be chosen independently of the stiffness of the assembly on which the values of the first series have been collected. According to one alternative embodiment, several computations of dispersions and deviations have been made in using several values of stiffness, for example a normalized stiffness values used to define a rigid assembly and an elastic assembly or a stiffness proper to the application.

During the computation of the dispersion, and the deviation relative to the objective, the disturbances generated by the tool are considered one by one so as to evaluate, for each disturbance, its contribution to the overall disturbance.

According to one embodiment, the evaluation of the individual influence of the disturbances on the dispersion and the deviation of screwing relative to the objective is done at the end of the following steps:

computing the mean of this difference on a period. This mean is representative of the deviation between the torque generated by the tool and the tightening torque objective. It is expressed as follows:

$$\bar{x} = C_{setpoint\ value} - f \int_0^{\frac{1}{f}} (T_S(\alpha) - T_R(\alpha)) d\alpha$$

computing the standard deviation of this third relationship. This standard deviation represents the dispersion introduced by the peak on the torque generated by the tool. It is expressed as follows:

$$\sigma = \frac{1}{\bar{x}} \times \sqrt{\int_0^{\frac{1}{f}} (T_S(\alpha) - (T_R(\alpha) - C_{cosetpoint\ value} + \bar{x}))^2 d\alpha}$$

These computations are repeated for each value of n (most of the values are close to 0, and non-significant. The highest values correspond to defects if any. With the characteristic frequencies of each element of the tool being known, it is possible to determine the defective element or elements).

In a second stage, at the step 4.6.2, the controller 6 evaluates the influence of all the disturbances on the dispersion and deviation of screwing relative to the objective, in so doing for the previously chosen values of stiffness or stiffnesses of assembly.

According to one embodiment, the computation is done by carrying out the following computations:

the mean values are added up, and the value thus computed represents the deviation between the torque generated by the tool and the tightening torque objective for all the peaks and therefore the disturbances induced by the tool. It is expressed as follows:

$$x_{mean} \geq C_{setpoint\ value} - \sum_{i=1}^{n}(\overline{x}_i - C_{setpoint\ value})$$

With i varying from 1 to n, i representing each of the disturbances.

the standard deviations are aggregated to give a value representative of the dispersion induced by all the peaks, it is expressed as follows (formula 1):

$$6\sigma \leq \sqrt{\sum_{i=1}^{n}(6\sigma_i)^2}$$

Indeed: $\sigma_{X+Y} = \sqrt{\sigma_X^2 + \sigma_Y^2 + 2\sigma_X\sigma_Y\rho(X,Y)}$ Now: $-1 \leq \rho(X,Y) \leq 1$ Hence: $\sigma_X^2 + \sigma_Y^2 + 2\sigma_X\sigma_Y\rho(X,Y) \leq \sigma_X^2 + \sigma_Y^2 + 2\sigma_X\sigma_Y$ Knowing that: $\sigma_X^2 + \sigma_Y^2 + 2\sigma_X\sigma_Y = (\sigma_X + \sigma_Y)^2$ We obtain: $\sigma_{X+Y} \leq \sqrt{\sigma_X^2 + \sigma_Y^2}$ This computation (formula 1) therefore makes it possible to verify the presence of an increase in the dispersion by the sum of the square of the dispersions, computed for each defect.

According to one particular embodiment and for purposes of security, the value obtained is increased relative to the real value.

At a step 4.7, the tests are carried out in order to determine whether the dispersion and the deviation are situated in an acceptable bracket and if not, a warning is issued. The results can be delivered in a table of the following type:

| Angle | Dispersion | | Deviation | |
|---|---|---|---|---|
| | Evaluation | Threshold | Evaluation | Threshold |
| 30° | $\sigma_{30}$ | | $\overline{x}_{30}$ | |
| 360° | $\sigma_{360}$ | | $\overline{x}_{360}$ | |
| Special angle | $\sigma_{special}$ | | $\overline{x}_{special}$ | |

Using such a table, it is possible to extract the dispersion and deviation for a given angle (case of a diagnostic, for a desired application, of the client, an analysis is made for a given angle. This makes it possible to identify a possible faulty component).

The following table presents the dispersions and the deviations for each disturbance:

| Disturbance | Dispersion | | Deviation | |
|---|---|---|---|---|
| | Evaluation | Threshold | Evaluation | Threshold |
| 1 | $\sigma_1$ | | $\overline{x}_1$ | |
| 2 | $\sigma_2$ | | $\overline{x}_2$ | |
| --- | --- | | --- | |
| n | $\sigma_n$ | | $\overline{x}_n$ | |

This table enables the identification of the components generating abnormal lack of precision, each of the disturbances 1 to n being associated with one of these components.

The exemplary embodiment of the method for controlling a quality level of work of a tool that has just been described in the above pages is considered to be the most precise method.

Another embodiment shall now be described in the form of another example. This embodiment refers to a method that is simpler but appreciably less precise.

5.2 Another Embodiment of the Invention

This other embodiment does not integrate an FFT computation and therefore does not lay down any special conditions for the recording of the torque table.

Figure 61:
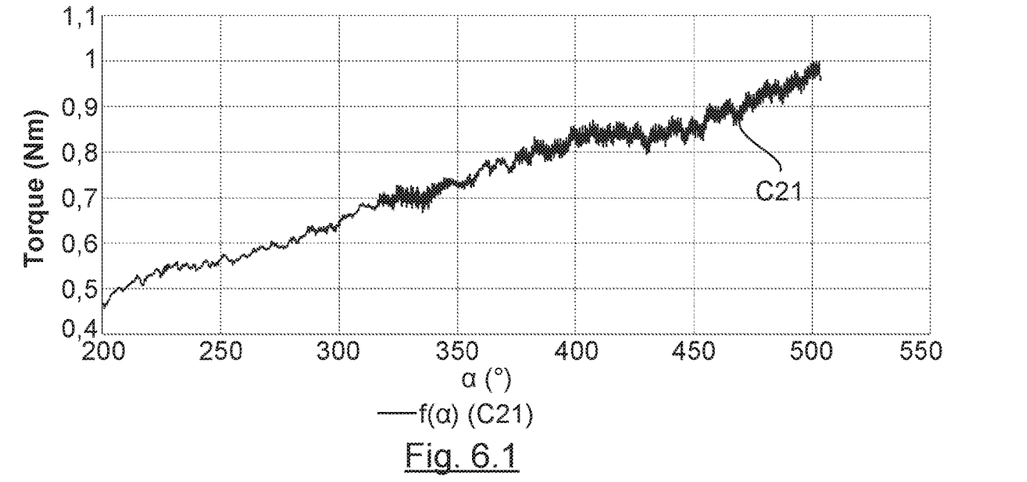

In a first stage and identically with the first embodiment, the torque table expressed as a function of the angle is computed and recorded. This step results in a series of values forming the first table, comprising:

$$C_{sensor} = f(\alpha)$$

FIG. 6.1 illustrates an example of a curve C21 representing this first table.

Figure 62:
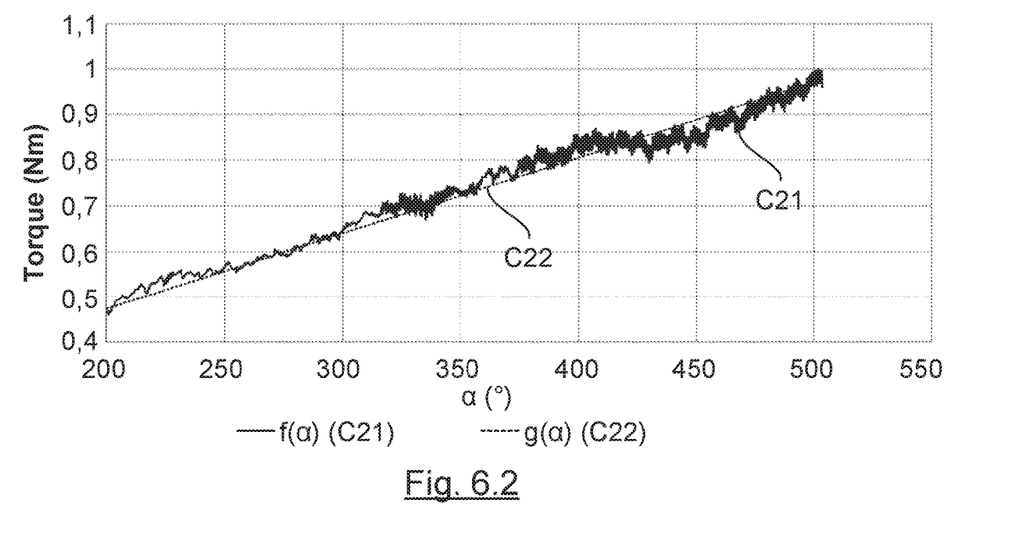

At a second stage, and identically with the first embodiment, the controller 6 determines the theoretical characteristic of the screw, which is the image of the true characteristic. The result of this step is a series of values, forming the second table, and expressing:

$$C_{true\ characteristic} = g(\alpha)$$

FIG. 6.2 illustrates an example of a curve C22 representing this second table, superimposed on the curve C21.

Figure 63:
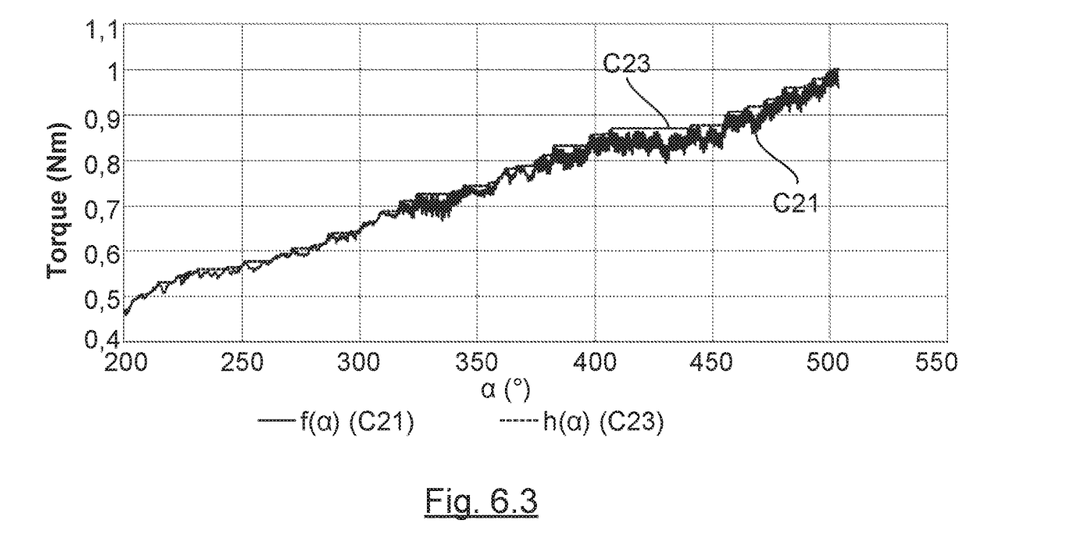

In a third stage and in a manner different from the first embodiment, the controller 6 isolates the share of the signal resulting from the disturbances generated by the tool. This third stage can be sub-divided into several steps:

I] Determining a first relationship from the torque table transmitted by the tool as a function of the angle, this first relationship expressing the fact that the stoppage of the tool does not take account of the decreases in torque. The table thus determined is expressed as follows:

$$h(\alpha) = \max_{0 \leq x \leq \alpha} f(x)$$

With $h(\alpha)$ the torque (Nm) computed by the controller 6 which expresses the fact that a stoppage of the tool cannot be activated on a torque value below a value previously attained during the tightening. As in the case of the previous method, the tool always stops at the level of a maximum value.

FIG. 6.3 illustrates an example of a curve C23 representing this table, superimposed on the curve C21.

II] Determining a second relationship expresses the differences between the first relationship and the theoretical characteristic. In other words, this second relationship gives, as a function of the angle, the difference between the torque table computed at the previous step and the theoretical characteristic of the screw (second table S2). The result of this is a series of values expressing:

$$\Delta C = h(\alpha) - g(\alpha)$$

Figure 64:
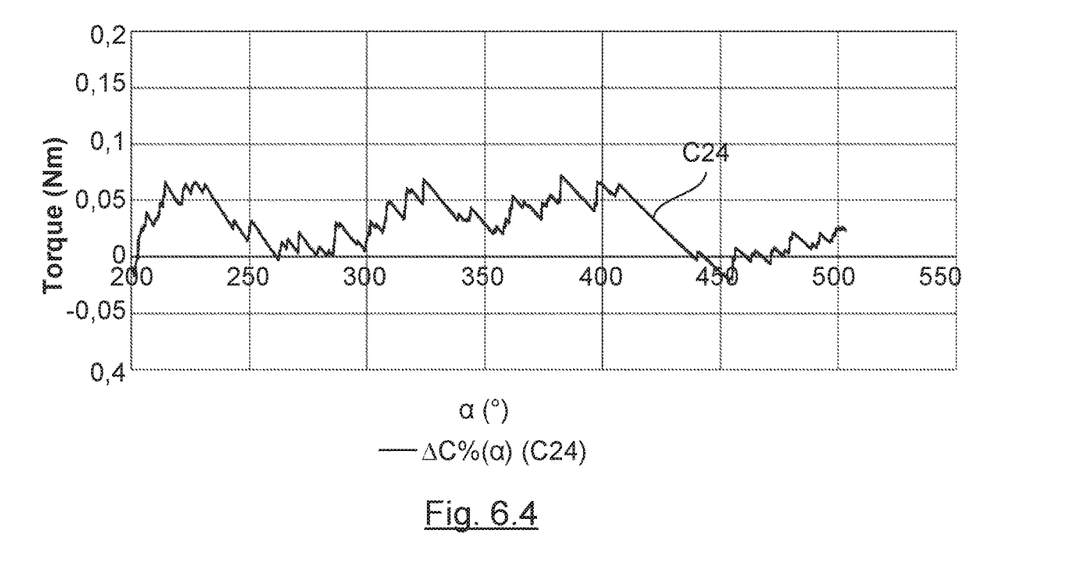

III] Determining a third relationship obtained by standardizing the second relationship relative to the theoretical characteristic: this step consists in establishing the relationship between the difference and theoretical characteristic of the screw. The result of this is a series of values constituting the third table and expressing:

$$\Delta C\%(\alpha) = (h(\alpha) - g(\alpha))/g(\alpha)$$

FIG. 6.4 illustrates an example of a curve C24 representing this third table.

In a fourth stage, the dispersion and the deviation relative to the objective resulting from said share of the signal which itself results from the disturbances generated by the tool are computed. This step enables the computation of the dispersion and the deviation relative to the tightening objective which are induced by the set of disturbances.

The mean of this difference on the totality of the signal is first of all computed. This mean represents the deviation between the torque generated by the tool and the objective of the tightening torque. It can be expressed by the following equation:

$$\bar{x} = C_{setpoint\ value} - \frac{1}{n}\sum_{y=1}^{n} \Delta C\ \%\ (y)$$

The standard deviation of this third relationship is then computed. This standard deviation represents the dispersion introduced in the torque measured by the tool. It can be expressed by the following equation:

$$\sigma = \frac{1}{\bar{x}} \times \sqrt{\frac{1}{n}\sum_{y=1}^{n} (\Delta C\ \%\ (y) - C_{setpoint\ value} + \bar{x})^2}$$

where n herein represents all the measurement points carried out during the work of the tool.

Unlike the first embodiment, in which only one period is taken into account because they are all considered to be identical, the second embodiment takes account of each oscillation. This second method has the advantage of taking disparities, if any, between the oscillations into consideration.

At a fifth stage and in a manner similar to the first embodiment, the results of evaluation and the possible alert is/are sent out.

This second embodiment is however appreciably less precise because it does not make it possible to obtain results for each frequency of disturbance and therefore to test each component individually.

The present invention thus makes it possible especially to determine whether a tool is capable or not of carrying out the task requested of it, in real time and on the production line. The invention can also be used, in the light of the measurement results, to determine whether or not the work, a screwing job for example, has been accurately done. Since the values characterizing the disturbances are detected and computed during work with the part produced, it is possible to carry out quality control after the parts have been produced and thus question the quality of certain parts if it turns out that the amplitude of these disturbances has been far too great.

The method of the invention makes it possible especially, depending on need and applications, to provide at least one of the following elements:
- an alert if the dispersion or deviation from the setpoint value of the tightening operations no longer meets production requirements, possibly during the use of the screwdriver in production (the quality/security aspect);
- an estimation of the dispersion and a deviation from the setpoint value of the tightening operations of the screwdriver for the usual tests stiffness, possibly during a maintenance test (the fast controls aspect);
- the detection of an abnormal amplitude of disturbance of a component and the generation of a warning (diagnostic aspect).

The invention thus makes it possible especially:
- to provide real-time warning to the user of an incapacity of the screwdriver to accurately perform the task for example during the use of the tool on an assembly line;
- to provide rapidly, in real time, an estimation of the dispersion and deviation relative to a tightening objective;
- to generate a warning if a component of the screwdriver deteriorates abnormally, especially to enable the tool assembler or the maintenance technician to identify the faulty component or components.

Although described through a certain number of detailed exemplary embodiments, the proposed method and the corresponding devices include different variants, modifications and improvements which in an obvious manner to those skilled in the art, given that these different variants, modifications and improvements form part of the scope of the invention as defined by the following claims. In addition, different aspects and characteristics described here above can be implemented together or separately, or else substituted for one another, and all the different combinations and sub-combinations of the aspects and characteristics form part of the scope of the invention. In addition, it can happen that certain devices described here above do not incorporate the totality of the modules and functions planned for the embodiments described.

The invention claimed is:

1. A method for controlling a level of screwing quality of a screwdriver relative to a predetermined screwing objective, implemented during the screwing of at least one assembly and comprising the following acts performed by a control unit:
producing, at a predetermined angular frequency, a first table of values comprising a series of doublets representative of a rise in torque in the screwing of at least one screw, each doublet comprising an angle value and a torque value measured by sensors comprised in the screwdriver;
producing, from said first table of values, a second table of values presenting the torque as a function of the angle, said second table being representative of a true characteristic of the at least one screw;
producing a third table of values, presenting the torque as a function of the angle and being representative of disturbances induced by said screwdriver during the rise in torque in the screwing of the at least one screw, from the first and second produced tables;
delivering at least one piece of information representative of a dispersion and/or a deviation relative to said screwing objective, resulting from an analysis of the third table for control usage of the level of screwing quality; and generating a warming signal, if said at least one piece of information representative of a dispersion and/or a deviation is above a predetermined threshold, wherein said analysis of the third table comprises the following sub-acts:

applying a discrete Fourier transform to the third table, delivering a frequency and an amplitude for each disturbance of a series of disturbances;

selecting at least one vibratory signature, represented by a frequency and an amplitude and representative of a disturbance present in the third table;

selecting a desired linear characteristic;

taking a sum of said linear characteristic and a sinusoidal signal having as a frequency, the frequency of said signature and having as an amplitude, the amplitude of said signature multiplied by the torque pf said screwing objective, delivering a first relationship expressing a tongue as a function of an angle;

establishing a second relationship expressing a torque as a function of an angle by eliminate decreases in torque of said first relationship;

subtracting, from said second relationship, of said linear characteristic to obtain a third relationship expressing a torque as a function of an angle;

computing the dispersion and/or deviation relative to said screwing objective induced by each vibratory signature from said third relationships; and then for all the selected vibratory signals, computing an overall dispersion and/or an overall deviation relative to said screwing objective induced by said selected vibratory signatures.

2. The method according to claim 1, wherein said act of producing a first table of values at a predetermined angular frequency implements:

a measurement and a recording of said doublets at a predetermined time frequency;

a classification of said doublets in a rough table in an ascending order or a descending order of the angle values;

a computation of the first table, in:

choosing the angle values in the form of an arithmetical sequence having a constant angular pitch; and computing the torque value for each value of said sequence in using an interpolation of the values of the rough table.

3. The method according to claim 2, wherein said act of producing the second table implements at least one of the following operations:

linear regression applied to said first table;

polynomial regression applied to said first table;

lowpass filtering applied to said first table at a cut-off frequency at the value of a defect having the lowest frequency.

4. The method according to claim 3, wherein said act of producing the third table includes the following:

subtraction, from the torque values of the first table, of the corresponding torque values of the second table;

division of the torque values by the corresponding torque values of the second table.

5. The method according to claim 1, wherein said sub-act of computing the dispersion and/the deviation relative to said screwing objective induced by each vibratory signature comprises at least one of the following operations:

determining a mean of said third relationship over a predetermined screwing angle interval;

determining a standard deviation, from said third relationship, on a predetermined screwing angle interval, representative of the dispersion introduced by the disturbance considered.

6. The method according to claim 1, wherein said sub-act of computing the overall dispersion and/or the overall deviation comprises the following sub-acts:

summing mean values corresponding to each of the disturbances, delivering a piece of data representative of the deviation relative to the screwing objective induced by all the disturbances;

aggregation of the standard deviations corresponding to each of the disturbances, delivering a piece of data representative of the dispersion induced by all the disturbances.

7. The method according to claim 1, wherein the act of producing is implemented over an angular range of screwing of at least 720°.

8. The method according to claim 7, wherein the act of producing implements an aggregation of at least two first tables, corresponding to at least two screwing operations, so as to have an angular screwing range of at least 720°.

9. The method according to claim 1, wherein the act of producing the third table comprises the following sub-acts:

establishing a maximized table from the first table by eliminating decreases in torque values of the first table;

subtracting, from the torque values of said maximized table, of the corresponding torque values of the second table, to give a differential table;

dividing the torque values of said differential table by the corresponding torque values of the second table to give the third table.

10. The method according to claim 9, wherein the act of analyzing includes at least one of the following sub-acts:

determining a mean for the third table;

determining a standard deviation of the third table representative of the dispersion induced by said screwdriver on the measured torque.

11. The method according to claim 1, further comprising generating results of evaluation of a level of dispersion and/or a deviation relative to a screwing objective, for a given disturbance and/or for a set of disturbances.

12. A screwdriver comprising:

at least one rotating element liable to generate disturbances on torque applied to a screw;

sensors configured to obtain, at a predetermined angular frequency, a series of doublets representative of a rise in torque in screwing of at least one screw implemented during screwing of the at least one screw by the at least one rotating element, the series of doublets constituting a first table of values, each doublet comprising an angle value and a torque value;

a control unit configured to control a level of screwing quality relative to a predetermined screwing objective during the screwing of the at least one screw by:

producing, from said first table of values, a second table of values presenting the torque as a function of the angle and representative of a true characteristic of the at least one screw;

producing a third table of values presenting the torque as a function of the angle and representative of the disturbances induced by said screwdriver during the rise in torque in the screwing operation for at least one screw, on the basis of the first and second tables;

analyzing the third table, delivering at least one piece of information representative of a dispersion and/or a deviation relative to said screwing objective, resulting from disturbances induced by said screwdriver; and generating a warning signal in response to said at least one piece of information representative of a dispersion and/or a deviation being above a predetermined threshold, wherein said analysis of the third performed by the control unit is based on:
 a discrete Fourier transform applied to the third table, delivering a frequency and an amplitude for each disturbance of a series of disturbances;
 a selection of at least one vibratory signature, represented by a frequency and an amplitude and representative of a disturbance present in the third table;
 a selection of a desired linear characteristic;
 an addition of said linear characteristic and a sinusoidal signal having as a frequency, the frequency of said signature and having as an amplitude, the amplitude of said signature multiplied by the torque of said screwing objective, delivering a first relationship expressing a torque as a function of an angle;
 establishment of a second relationship expressing a torque as a function of an angle by eliminate decreases in torque value of said first relationship;
 a subtraction, from said second relationship, of said linear characteristic to obtain a third relationship expressing a torque as a function of an angle;
 computation of the dispersion and/or deviation relative to said screwing objective induced by each vibratory signature from said third relationship; and
 for all of the selected vibratory signals, a computation of an overall dispersion and/or an overall deviation relative to said screwing objective induced by said selected vibratory signatures.

13. A non-transitory computer-readable medium comprising a computer program product stored thereon, comprising program code instructions to implement a method for controlling a level of screwing quality of a screwdriver relative to a predetermined screwing objective when said program is executed by a microprocessor of the screwdriver and implemented during the screwing of at least one assembly, wherein the program code instructions configure the screwdriver to perform acts comprising:
 producing, at a predetermined angular frequency, a first table of values comprising a series of doublets representative of a rise in torque in the screwing of at least one screw, each doublet comprising an angle value and a torque value measured by sensors comprised in the screwdriver;
 producing, from said first table of values, a second table of values presenting the torque as a function of the angle, said second table being representative of a true characteristic of the at least one screw;
 producing a third table of values, presenting the torque as a function of the angle and being representative of disturbances induced by said screwdriver during the rise in torque in the screwing of the at least one screw, from the first and second produced tables;
 delivering at least one piece of information representative of a dispersion and/or a deviation relative to said screwing objective, resulting from an analysis of the third table for control usage of the level of screwing quality; and
 generating a warning signal, if said at least one piece of information representative of a dispersion and/or a deviation is above a predetermined threshold,
 wherein said analysis of the third table comprises the following sub-acts:
  applying a discrete Fourier transform to the third table, delivering a frequency and an amplitude for each disturbance of a series of disturbances;
  selecting at least one vibratory signature, represented by a frequency and an amplitude and representative of a disturbance present in the third table;
  selecting a desired linear characteristic;
  taking a sum of said linear characteristic and a sinusoidal signal having as a frequency, the frequency of said signature and having as an amplitude, the amplitude of said signature multiplied by the torque of said screwing objective, delivering a first relationship expressing a torque as a function of an angle;
  establishing a second relationship expressing a torque as a function of an angle by eliminate decreases in torque value of said first relationship;
  subtracting, from said second relationship, or said linear characteristic to obtain a third relationship expressing a torque as a function of an angle;
  computing the dispersion and/or deviation relative to said screwing objective induced by each vibratory signature from said third relationship; and
  then for all of the selected vibratory signals, computing an overall dispersion and/or an overall deviation relative to said screwing objective induced by said selected vibratory signatures.

\* \* \* \* \*